United States Patent
Savitski

(10) Patent No.: US 11,541,609 B2
(45) Date of Patent: Jan. 3, 2023

(54) SYSTEM AND METHOD FOR SIMULTANEOUS WELDING OF PLASTIC BAGS USING A CARRIER FILM

(71) Applicant: Dukane IAS, LLC, St. Charles, IL (US)

(72) Inventor: Alexander Savitski, Arlington Heights, IL (US)

(73) Assignee: Dukane IAS, LLC, St. Charles, IL (US)

( * ) Notice: Subject to any disclaimer, the term of this patent is extended or adjusted under 35 U.S.C. 154(b) by 904 days.

(21) Appl. No.: 16/212,664

(22) Filed: Dec. 6, 2018

(65) Prior Publication Data

US 2020/0009797 A1    Jan. 9, 2020

Related U.S. Application Data

(63) Continuation-in-part of application No. 16/026,909, filed on Jul. 3, 2018.

(51) Int. Cl.
  *B29C 49/28* (2006.01)
  *B29C 65/16* (2006.01)
  (Continued)

(52) U.S. Cl.
  CPC .......... *B29C 65/168* (2013.01); *B29C 66/43* (2013.01); *B29C 66/71* (2013.01); *B29C 66/8511* (2013.01); *B29L 2031/7128* (2013.01)

(58) Field of Classification Search
  None
  See application file for complete search history.

(56) References Cited

U.S. PATENT DOCUMENTS

| | | | |
|---|---|---|---|
| 4,266,667 | A | 5/1981 | Ishigaki |
| 5,601,676 | A | 2/1997 | Zimmerman |

(Continued)

FOREIGN PATENT DOCUMENTS

| | | |
|---|---|---|
| EP | 2813347 A1 | 12/2014 |
| FR | 2785564 A1 | 5/2000 |

(Continued)

OTHER PUBLICATIONS

"Plastic Racing Into The Future" ANTEC '96—vol. 1—Processing 1996, Copyright © 1996 By The Society of Plastics Engineers, 9 pages.

(Continued)

*Primary Examiner* — Daniel Mcnally
(74) *Attorney, Agent, or Firm* — Nixon Peabody LLP

(57) ABSTRACT

A laser welding system is directed to simultaneously joining respective layers of a first bag and a second bag. The system includes a first film layer adjacent to a second film layer for forming the first bag, and a third film layer adjacent to a fourth film layer for forming the second bag, each layer of the plurality of film layers being made of a thermoplastic material that absorbs laser radiation having a wavelength of about 2 microns. A non-absorbing carrier film layer is positioned between the second film layer and the third film layer, the non-absorbing carrier film layer being made of a material that transmits substantially all energy of the laser radiation. A laser source applies the laser radiation toward portions of the plurality of film layers to be joined, forming the first bag generally simultaneously with the second bag.

11 Claims, 6 Drawing Sheets

(51) Int. Cl.
B29C 65/00 (2006.01)
B29L 31/00 (2006.01)

(56) References Cited

U.S. PATENT DOCUMENTS

| | | | |
|---|---|---|---|
| 6,465,757 | B1 | 10/2002 | Chen |
| 9,453,631 | B2 | 9/2016 | Sagesaka et al. |
| 2001/0028567 | A1 | 10/2001 | Akiyama |
| 2003/0196750 | A1 | 10/2003 | Sakai |
| 2004/0080573 | A1 | 4/2004 | Buchanan et al. |
| 2004/0108040 | A1 | 6/2004 | Field et al. |
| 2005/0121137 | A1 | 6/2005 | Kirkland |
| 2006/0105077 | A1 | 5/2006 | Keller |
| 2006/0134994 | A1 | 6/2006 | Yasuda |
| 2006/0237129 | A1 | 10/2006 | Chen |
| 2006/0283544 | A1 | 12/2006 | Mori |
| 2008/0077173 | A1 | 3/2008 | Flanagan |
| 2010/0191148 | A1 | 7/2010 | Matsumura et al. |
| 2010/0247822 | A1 | 9/2010 | Ziolkowski et al. |
| 2011/0100963 | A1 | 5/2011 | Mangols et al. |
| 2011/0200802 | A1 | 8/2011 | Li |
| 2013/0022766 | A1 | 1/2013 | Butzke et al. |
| 2013/0320276 | A1 | 12/2013 | Farrell |
| 2014/0069921 | A1 | 3/2014 | Kristal |
| 2015/0083302 | A1 | 3/2015 | Sawada |
| 2015/0124461 | A1 | 5/2015 | Sagesaka et al. |
| 2017/0182592 | A1 | 6/2017 | Savitski |
| 2018/0071990 | A1 | 3/2018 | Savitski |
| 2018/0099456 | A1 | 4/2018 | Savitski |

FOREIGN PATENT DOCUMENTS

| | | | |
|---|---|---|---|
| JP | 02266919 | A | 10/1990 |
| JP | 2002067164 | A | 3/2002 |
| JP | 2004050513 | A | 2/2004 |
| JP | 2004063332 | A | 2/2004 |
| JP | 2004142225 | A | 5/2004 |
| JP | 2007230051 | A | 9/2007 |
| JP | 2009119024 | A | 6/2009 |
| JP | 2009119807 | A | 6/2009 |
| JP | 5288867 | B2 | 9/2013 |
| JP | 2014034166 | A | 2/2014 |
| JP | 2017130445 | A | 7/2017 |
| WO | WO 2016/024427 | A1 | 2/2016 |

OTHER PUBLICATIONS

"Infrared Welding of Thermoplastics, Colored Pigments and Carbon Black Levels on Transmission of Infrared Radiation"., by Robert A. Grimm and Hong Yeh—Edison Welding Institute, 7 pages.

"Application With Infrared Welding of Thermoplastics"., by David A. Grewell, Branson Ultrasonics Coroporation, 5 pages.

Forward to Better Understanding of Optical Characterization and Development of Colored Polyamides for the Infra-Red/Laser Welding: Part I—Efficiency of Polyamides for Infra-Red/Laser Welding, by Val Kagan, Robert Bray and Al Chambers—Honeywell International, Engineered Applications & Solutions, Morristown, NJ 07962-2332, USA, 7 pages.

"Three Approaches in Utilizing High Power Diode Laser to Join Thermoplastics"; by Steven A. Kocheny—Lester Technologies, LLC., and Jerry Zybko—Lester Technologies, LLC., 5 pages.

"Comparative Investigations on Quasi-Simultaneous Welding on the Basis of the Materials Peek and PC", by H. Potente, G. Fiegler, F. Becker and J. Korte—University of Paderborn, Paderborn, Germany, 5 pages.

"3D-Laser Transmission Welding", by H. Haberstroh, R. Luetzeler—Institut für Kunststoffverarbeitung, Aachen, Germany, 6 pages.

International Search Report and Written Opinion of International Searching Authority for Application No. PCT/US2004/040791, dated Jul. 2, 2007 (6 pages).

Rennert et al.; "Laser-adapted construction for plastic welding"; retrieved on Jan. 15, 2007 from http://www.rofin.com/deutsch/anwendunen/laser-mikro-micro/data/E_PlastEurope02-04_Laser_adapted_Construction.pdf (p. 6, col. 1).

International Search Report and Written Opinion of International Searching Authority for Application No. PCT/US2017/051734, dated Dec. 6, 2017 (10 pages).

"Klare Sicht mit neuem Licht"; Kunststoffe, Jun. 1, 2015, pp. 26-29, in German; XP055199510 (4 pages).

International Search Report and Written Opinion of International Searching Authority for Application No. PCT/US2017/054684, dated Jan. 16, 2018 (12 pages).

International Search Report and Written Opinion of International Searching Authority for Application No. PCT/US2019/040380, dated Nov. 11, 2019 (20 pages).

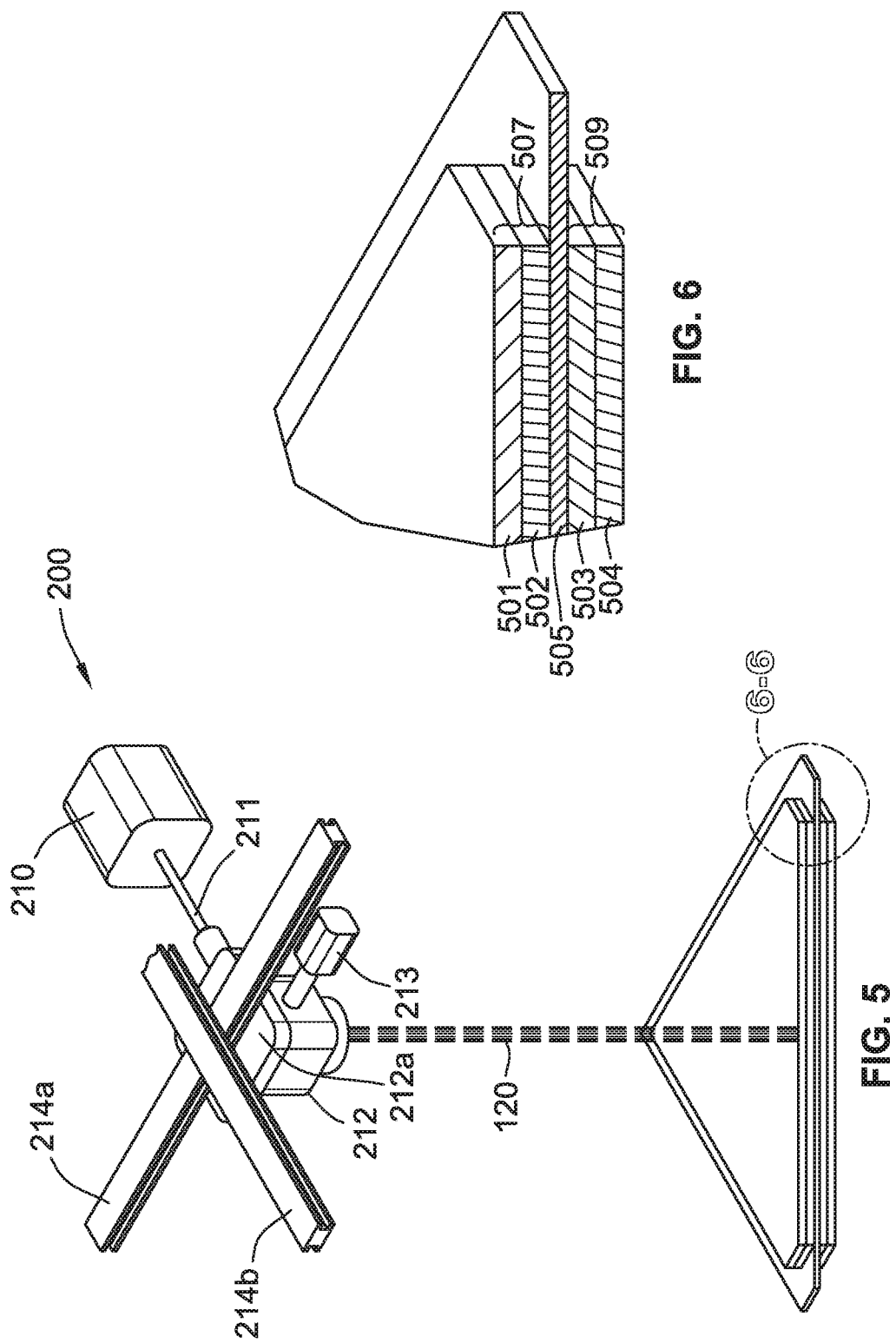

SYSTEM AND METHOD FOR SIMULTANEOUS WELDING OF PLASTIC BAGS USING A CARRIER FILM

CROSS-REFERENCE TO RELATED APPLICATIONS

This application is a continuation-in-part of U.S. application Ser. No. 16/026,909, titled "Laser Welding System And method Using Machined Clamping Tool," filed Jul. 3, 2018, which is incorporated by reference in its entirety.

FIELD OF THE INVENTION

The present disclosure relates generally to laser welding of thermoplastic materials and, more particularly, to laser welding that uses laser radiation having a 2-micron wavelength to simultaneously weld a plurality of bags using a carrier film as a separator between two adjacent bags.

BACKGROUND OF THE PRESENT DISCLOSURE

Laser welding uses a laser beam to melt thermoplastic material in a joint area by delivering a controlled amount of energy to a precise location. Systems have been developed for controlling the beam size, and a variety of methods are available for precisely positioning and moving the beam. Laser welding is based on the same basic requirements of material compatibility as other welding techniques, but is often found to be more forgiving of resin chemistry or melt temperature differences than most other plastic welding processes. Nearly all thermoplastics can be welded using a proper laser source and appropriate joint design.

Conventional laser-welding processes for plastic materials most commonly utilize lasers emitting radiation having a wavelength of about around 1 micron, e.g., 808 nm, 960 nm, 980 nm, 1050 nm, or 1064 nm. At these wavelengths, thermoplastic materials do not absorb infrared radiation, and the welding process exploits a selective heating effect. In this broadly accepted approach the laser radiation is being transmitted through the upper part of the two parts to be joined and clamped together for welding, and is absorbed by the bottom part, which has a laser absorbing additive, most common of which is carbon black. If the surface of the upper part is flat, the clamping tools for this laser welding process normally incorporate a glass plate, which allows to apply clamping pressure on the assembly, while transmitting the laser beam being directed through it to the welding surface. When the upper surface has a curvature or a complex shape, the clamping tool is often made from some clear plastic easy to machine, most commonly Acrylic, which does not absorb laser radiation emitted by 1-micron lasers and transmits the laser beam to the workpieces with minimal power losses. These materials also have sufficient rigidity to transfer clamping force to the assembly being welded. However, they are suitable only for lasers having a wavelength of about 1 micron.

A laser-welding process that utilizes a 2-micron laser wavelength allows unfilled plastics to be welded without the presence of any laser sensitive additive, as most of the plastic materials can be melted with such a laser. This process offers a significant advantage compared to the welding process based on utilizing a 1-micron laser, which requires the presence of the laser sensitive additive in the bottom part of the assembly. However, a need exists for a laser welding process that uses a 2-micron laser wavelength for joining workpieces having complex or non-flat surface geometries. The materials used for making clamping fixtures in the 1-micron wavelength laser welding process are not suitable for 2-micron laser welding processes.

In accordance with another aspect of laser-welding, IV bags and similar containers for pharmaceutical industry are typically made using Radio Frequency (RF) welding, e.g., for polyvinyl chloride (PVC) materials, or heat-seal welding, e.g., for polyolefin-based materials (including various multi-layer structures). Typically, an IV bag is made by applying heat and welding pressure on a web of two layers of film that form the bag. This approach is efficient and allows to make a number of bags in one cycle by using a large tool that covers sheets of material sufficient to make 4-8 bags. However, regardless of the shape of the bag, present methods do not allow to differentiate welding parameters, resulting in applying the same amount of heat on the sides of the bag and on its corners and curves. Consequently, the heat application results in overheating the bag corners and curves. Thinning of material and pinholes in the bag's corners are common defects, affecting total throughput and driving the scrape rate and stoppage time for frequent process adjustments.

Using a 1940 nm laser allows welding of thermoplastic films without the need for special laser sensitive additive. It has been demonstrated that bags welded with a laser have a superior quality compared to RF or heat-seal welding. The laser-welding process is done by scanning the perimeter of the bag with a laser beam, and forming a strong and consistent seal along the weld line. This approach allows to differentiate heat input for every segment of the shape of the bag, specifically optimizing it for straight portions and for the corners of the bag, resulting generally in a more consistent weld and better throughput than RF or heat-seal welding methods. A major problem of the present laser-welding method, however, is that it is based on the laser beam scanning the length of the weld perimeter, which requires significant time to complete the process. As such, the present laser-welding method is significantly slower than heating the whole perimeter of several bags at once, as it is typically done by large RF and heat-seal machines. Thus, although the quality of laser-welded bags is better, the process speed is significantly slower, which to a large degree impedes adopting laser-welding process in manufacturing of bags.

The present disclosure addresses these and other needs and solves these and other problems. For example, heretofore, no person of ordinary skill in the art has determined how to form simultaneous bags using a laser-welding process.

SUMMARY OF THE PRESENT DISCLOSURE

The clamping requirements and the approaches to address them are essentially the same for both processes (1-micron and 2-micron), however as most plastics absorb laser radiation around the 2-micron laser wavelength, it makes it impossible to use such plastics for clamping the assembly, as such a tool would melt under the laser beam in the same way as the part being welded. Because it is impossible to transfer clamping force directly onto the welding area in cases when the outer surface is not flat, as using a sheet of glass is not an option, which makes clamping tooling for a 2-micron laser complex and time-consuming to manufacture.

Through careful research of material properties of commercially available plastics and direct experimentation, the inventors have established that one class of materials in particular, namely fluoropolymers such as fluorinated ethylene propylene (FEP), meets the competing requirements of having low power losses when transmitting the laser beam having a wavelength of 1940 nanometers (about 2 microns), as well as the material's ability to be processed and machined to conform to an irregular, complex, or non-flat shape. The measurements of power losses in FEP (e.g., marketed under the brand TEFLON) have shown that the power losses in this material are compatible with power losses in borosilicate glass when transmitting the laser beam with a wavelength of 1940 nanometers (about 2 microns). That makes FEP material and other fluoropolymer materials uniquely suitable for making clamping tools for welding process utilizing a 2-micron laser.

In accordance with an embodiment, a laser welding method is provided for joining portions of a pair of workpieces made of a thermoplastic material that absorbs laser radiation having a wavelength of about 2 microns (e.g., 1940 nm). The workpiece material does not have to be optically transparent. It can be of a natural color, like PE or PP, or many other thermoplastic materials which are not optically clear, but which are transparent to laser radiation. Or one or both workpieces can have a pigment, which is not necessarily a laser-absorbing agent like carbon black. Alternately, the workpieces can have a pigment that can absorb just a portion of the radiation, but have enough radiation transmitted to the interface and bottom part. The method includes clamping the thermoplastic workpieces between a pair of clamping tools, at least one of which is made of a plastic material that has substantially the same power loss as borosilicate glass when transmitting laser radiation having a wavelength of about 2 microns through the material. The laser radiation is directed onto the workpieces through a clamping tool to melt the irradiated portion of the workpieces while mechanically pressing them together. The laser radiation is then turned off and the workpieces are allowed to solidify before releasing them from the clamping tools. The clamping tool through which the laser radiation passes can be made of a fluoropolymer such as fluorinated ethylene propylene (FEP), which has substantially the same power loss as borosilicate glass when transmitting laser radiation having a wavelength of about 2 microns.

The power of the laser radiation and the movement path of the laser radiation along the clamped workpieces is controlled to melt the workpieces in the portions or areas to be joined. The baseplate can be made of a material that cannot transmit or is otherwise impervious to the laser radiation.

An actuator such as a pneumatic cylinder urges at least one of the clamping tools or plates toward the other clamping tool or plate to press the workpieces together, while laser radiation is applied to the portions of the clamped workpieces to be joined. The power of the laser radiation and the rate of movement of the laser radiation along the clamped workpieces can be controlled to melt uniformly the workpieces in the areas to be joined.

According to one embodiment of the disclosure, a laser welding method is directed to simultaneously joining respective film layers of a plurality of bags. The method includes positioning a plurality of film layers adjacent to and in an overlapping manner with each other, the plurality of film layers including a first film layer adjacent to a second film layer and a third film layer adjacent to a fourth film layer. Each layer of the plurality of film layers is made of a thermoplastic material that absorbs laser radiation having a wavelength of about 2 microns. The method further includes separating the second film layer and the third film layer with a non-absorbing carrier film layer, the non-absorbing carrier film layer being made of a material that transmits substantially all energy of the laser radiation. The method also includes directing the laser radiation onto the first film layer and the second film layer to melt irradiated portions of the first film layer and the second film layer to one another forming a first bag. The method further includes transmitting substantially all the energy of the laser radiation through the non-absorbing carrier film interposed between the second film layer and the third film layer. The method includes directing the transmitted energy of the laser radiation onto the third film layer and the fourth film layer to melt irradiated portions of the third film layer and the fourth film layer to one another forming a second bag, the second bag being formed generally simultaneously with the first bag. The method further includes turning off the laser radiation and allowing at least the irradiated portions of the first film layer, the second film layer, the third film layer, and the fourth film layer to solidify.

According to another embodiment of the disclosure, a laser welding system is directed to simultaneously joining respective layers of a first bag and a second bag. The system includes a plurality of film layers positioned adjacent to and in an overlapping manner with each other. The plurality of film layers includes a first film layer adjacent to a second film layer for forming the first bag, and a third film layer adjacent to a fourth film layer for forming the second bag. Each layer of the plurality of film layers is made of a thermoplastic material that absorbs laser radiation having a wavelength of about 2 microns. The system further includes a non-absorbing carrier film layer positioned between the second film layer and the third film layer, the non-absorbing carrier film layer being made of a material that transmits substantially all energy of the laser radiation. The system also includes a laser source applying the laser radiation toward portions of the plurality of film layers to be joined. The laser source causes irradiated portions of the first film layer and the second film layer to form the first bag by melting the irradiated portions to one another, and irradiated portions of the third film layer and the fourth film layer to form the second bag by melting the irradiated portions to one another. The first bag is formed generally simultaneously with the second bag.

According to yet another embodiment of the disclosure, a laser welding system is directed to simultaneously joining respective layers of a plurality of bags. The system includes a plurality of film layers positioned adjacent to and in an overlapping manner with each other. The plurality of film layers includes a first film layer adjacent to a second film layer for forming a first bag, and a third film layer adjacent to a fourth film layer for forming a second bag. Each layer of the plurality of film layers is made of a thermoplastic material that absorbs laser radiation having a wavelength of about outside of a range between approximately 808 nanometers and approximately 1064 nanometers. The system further includes a non-absorbing carrier film layer positioned between the second film layer and the third film layer, the non-absorbing carrier film layer being made of a material that transmits substantially all energy of the laser radiation, such as non-stick fluorinated ethylene propylene (FEP). The non-absorbing carrier film lacks a laser-absorbing additive. The system also including a laser source applying the laser radiation toward portions of the plurality of film layers to be joined. The laser source causing irradiated portions of the first film layer and the second film layer to form the first bag by melting the irradiated portions to one another, and irradiated portions of the third film layer and the fourth film layer to form the second bag by melting the irradiated portions to one another. The first bag is formed generally simultaneously with the second bag.

BRIEF DESCRIPTION OF THE DRAWINGS

FIG. 5 is an exploded perspective view of a laser welding arrangement for welding two bags simultaneously.

FIG. 6 is an enlarged view of Detail "6-6" in FIG. 5.

DETAILED DESCRIPTION OF ILLUSTRATED EMBODIMENTS

Figure 1:
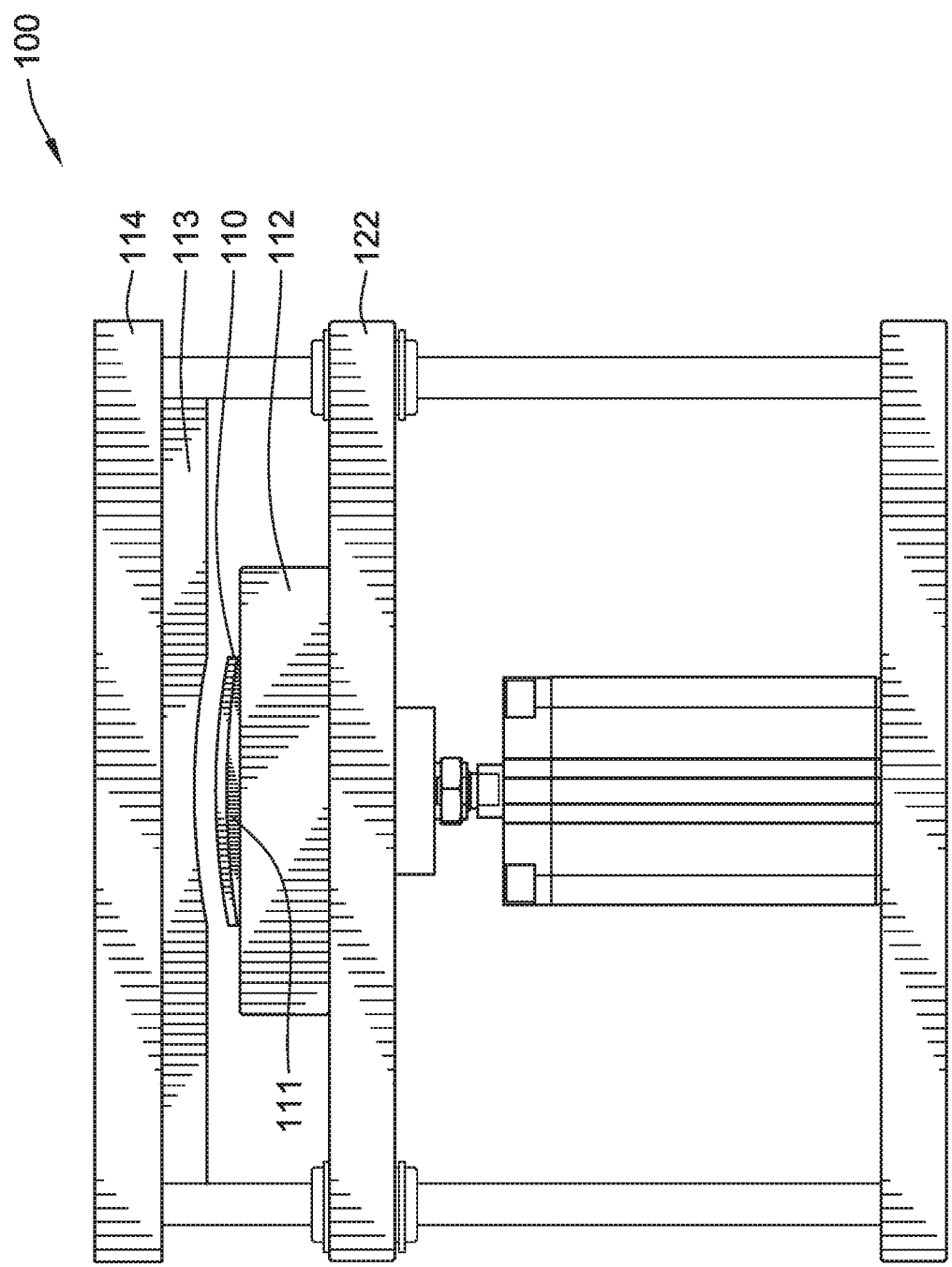
FIG. 1 is a side elevation of a laser welding arrangement for welding two thermoplastic sheets while clamping the two thermoplastic workpieces to be welded.

Although the present disclosure will be described in connection with certain preferred embodiments, it will be understood that the present disclosure is not limited to those particular embodiments. On the contrary, the present disclosure is intended to cover all alternatives, modifications and equivalent arrangements as may be included within the spirit and scope of invention as defined by the appended claims.

The laser radiation used in the embodiments disclosed herein can have a wavelength of about 2 microns (e.g., 1940 nm), which is capable of melting thermoplastic materials that do not contain any laser-sensitive additive whatsoever, such as carbon black, to absorb the laser radiation. As used herein, a clamping tool, claiming element, or clamping plate refer to a structure, which is not required to have a flat surface, used for clamping in conjunction with another clamping tool or element or plate. The term plate is not intended to convey that the clamping structure has a flat surface. On the contrary, the present disclosure advantageously discloses that fluoropolymer material, which is machineable yet allows transmission of 2-micron laser radiation, thereby allowing the clamping tool to have any shape or contour, as a surprisingly suitable material for use as a clamping tool in laser welding applications.

One or both of the clamping elements are made of a fluoropolymer such as fluorinated ethylene propylene (FEP). Through experimentation, the inventors have found that FEP clamping elements do not absorb a significant amount of laser radiation having about a 2-micron wavelength. In other words, substantially all of the laser radiation is transmitted through the fluoropolymer material, making fluoropolymers uniquely suitable for laser welding applications outside of the range of wavelengths between 808 nm and 1064 nm, such as 2 microns. Thus, the FEP clamping elements can transfer clamping forces directly onto the parts (workpieces) being welded, even when the outer surfaces of the parts are not flat, while also permitting transmission of substantially all (e.g., at least 90% or at least 91% or at least 92% or at least 93% or at least 94% or at least 95% or at least 96% or at least 97% or at least 98% or at least 99%) of the laser radiation onto the workpiece. The following Table 1 illustrates power loss measurements for FEP compared to borosilicate glass, which shows very comparable power losses among FEP and glass, making FEP a highly suitable substitute for glass while being machineable to readily conform the material's shape to match complex or irregular workpiece surfaces.

Power loss measurements for FEP (TEFLON)
Laser source: IPG Photonics 120 W 1940 um

TABLE 1

| Power setting (%) | Transfer Media | | | |
| --- | --- | --- | --- | --- |
| | No Media, Power meter reading (W) | FEP, ⅛-in, Power meter reading (W) | FEP, ¼-in, Power meter reading (W) | Glass, ⅜-in, Power meter reading (W) |
| 20 | 11.00 | 10.3 | 10.6 | 10.3 |
| 20 | | 10.4 | 10.6 | 10.2 |
| 50 | 50.4 | 47.6 | 47.8 | 46.9 |
| 50 | | 46.9 | 48.2 | 46.8 |
| 80 | 91.9 | | 86.4 | 83 |
| 80 | | | 85.6 | 82.5 |
| 100 | 116 | | 109 | 108 |
| 100 | | | 108 | 107 |

Turning to the drawings, a laser welding arrangement 100 includes a pair of workpieces 110 and 111, which are held against each other in a "nest" 112 that has a top surface 113 machined to form a regular or irregular cavity that matches the configuration or surface contour of the lower surface 115 of the lower workpiece 111. Upper portions of the workpieces 110 and 111 extend above the nest 112 to engage a top clamping plate 113, which in turn engages a fixed top retaining plate 114, and a clamping plate 113 presses downwardly against the parts 110 and 111 to urge them against the bottom wall 112b of the nest 112. The nest 112 is supported by a bottom clamping plate 122 that holds the workpieces 110 and 111 against the bottom wall 112b of the nest cavity 112a.

While the two workpieces 110 and 111 are pressed together, their adjoining surfaces are melted by laser radiation having a wavelength of about 2 microns (e.g., 1940 nm), which is capable of melting thermoplastic materials that do not contain any laser-sensitive additive to absorb the laser radiation. When 2-micron radiation is used, no such additive is required because most thermoplastic materials absorb radiation having that wavelength. The term "2-micron" as used herein encompasses 1940 nm.

At least that part of the clamping plate 113 through which the laser 120 passes is made of a fluoropolymer such as fluorinated ethylene propylene (FEP), which does not absorb any significant amount of laser radiation that has a 2-micron wavelength. Thus, the FEP clamping plate 113 can transfer clamping forces directly onto the upper workpiece 110. When the top surface 117 of the upper workpiece 110 is not flat, the lower surface 119 of the FEP clamping element 113 can be machined to match the top surface of the workpiece 110 where the clamping element 113 interfaces with the top surface 117 of the workpiece 110. In other words, it is not necessary for the entire lower surface 119 of the FEP clamping element 113 to have a non-flat or irregular or complex geometry. The lower surface 119 of the FEP clamping element 113 needs only to be non-flat, irregular, or complex in those areas where the clamping element 113 interfaces with the correspondingly non-flat, irregular, or complex top surface of the workpiece 110. The terms "upper," "lower," "top," or "bottom" are not intended to limit the orientation of the clamping elements and workpieces in an upright or vertical configuration, but rather to differentiate the different surfaces of the structures from one another.

Figure 3:
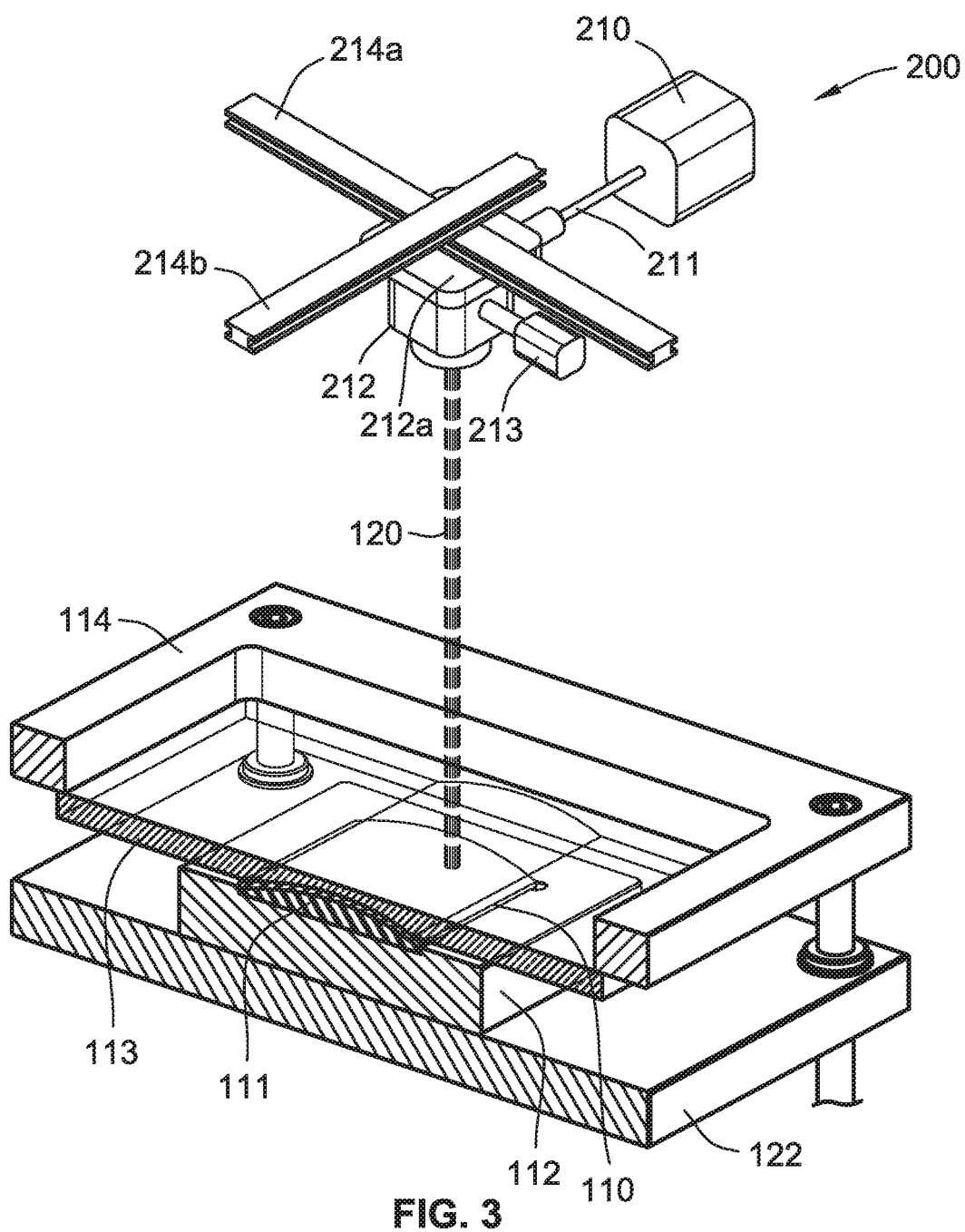
FIG. 3 is a sectioned perspective view of the laser welding arrangement shown in FIG. 1.

A laser assembly 200 shown in FIG. 3 includes a conventional laser source, which generates a laser beam 120 of radiation (shown in FIG. 3) having a wavelength of, e.g., about 2 microns (e.g., 1940 nm). The mount 212a is coupled to orthogonal gantries 214a and 214b. One or more scanner mirrors within the scan head 212 are controlled by a processor-controlled drive unit 213 to direct a laser beam 215 downwardly onto a stack 116 that includes two thermoplastic workpieces 110 and 111 to be joined by welding. The drive unit 213 is controlled to adjust the positions of the scanner mirrors to move the laser beam 120 in a manner required to illuminate a prescribed weld zone on the top surface of the stack 116.

Figure 2:
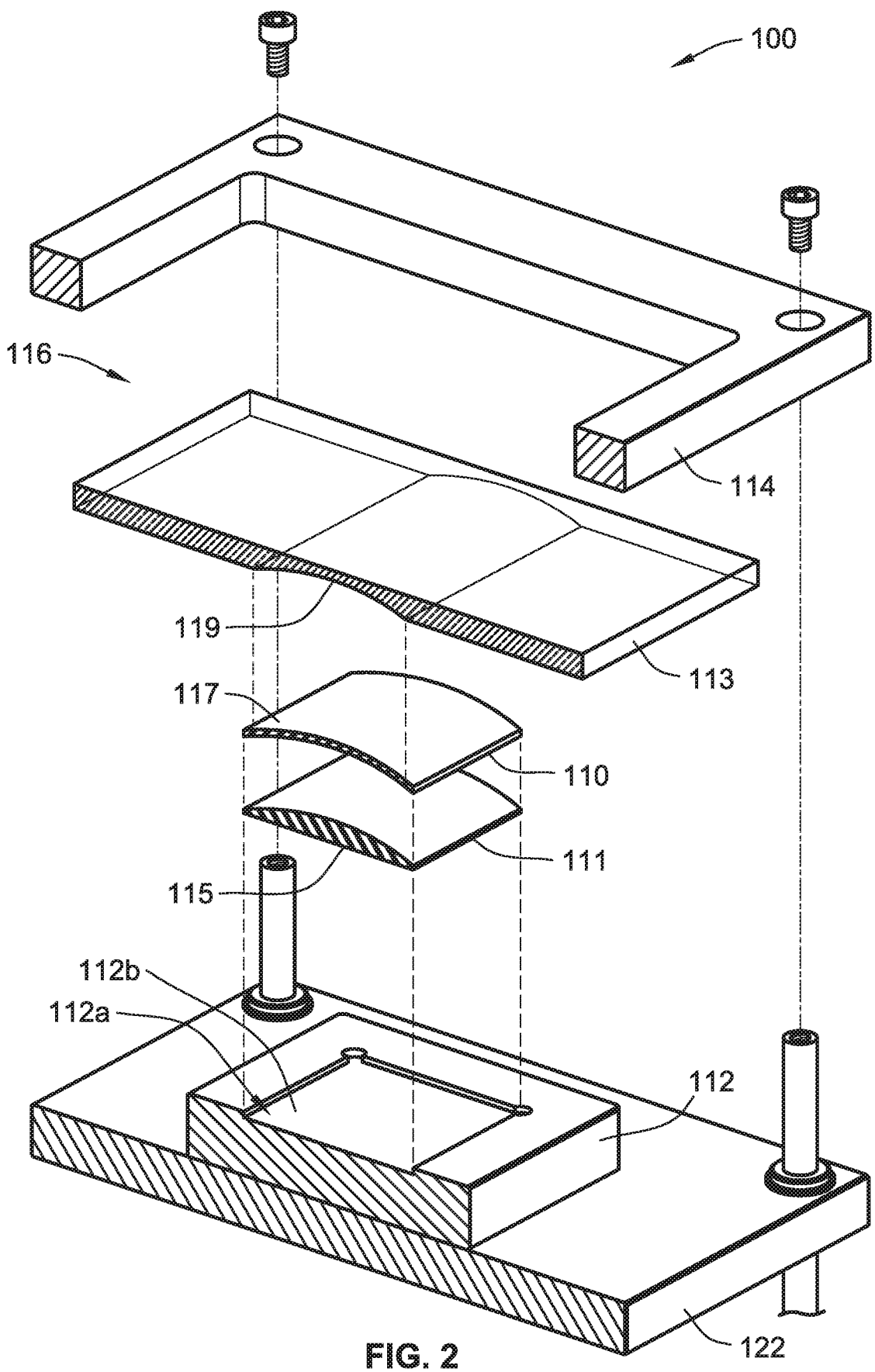
FIG. 2 is an exploded perspective view of the laser welding arrangement shown in FIG. 1.

As depicted in FIG. 2, the two thermoplastic workpieces 120 and 121 are clamped together by a pair of clamping plates 113 and 122. The upper plate 113 is transmissive, i.e., the laser beam 120 can pass through the upper plate with virtually no loss. This upper plate 113 can be made of glass. The lower plate 122 is non-transmissive, i.e., the laser 120 cannot penetrate the lower plate 122 and thus is diffracted against the lower plate 122, which is sometimes referred to in the art to which this disclosure pertains as a "nest" 112. Both clamping plates 113, 122 are rigid, and the lower plate 122 is preferably made of metal.

The upper clamping plate 113 is pressed downwardly on the upper workpiece 110 by a controllable actuator to clamp the workpieces 110 and 111 firmly against the lower plate 122. The downward pressure is maintained on the workpieces 110, 111 while the laser beam 120 traverses a prescribed or arbitrary weld zone or path, progressively heating impacted zones or areas of the thermoplastic workpieces to melt the thermoplastic material in the weld zone to fuse the workpieces together in that zone. The weld is then completed by allowing the workpieces 110, 111 to cool under pressure, thereby solidifying the thermoplastic material that was melted by the laser 120 in the weld zone. This heating and cooling of the thermoplastic materials progresses along the prescribed weld zone as the laser beam 120 is advanced along that zone, which typically extends around the entire circumference of the workpieces 110, 111, although any other predefined or arbitrary traversal path is contemplated herein. The particular traversal path that the laser follows is of no importance to the inventive aspects of the present disclosure.

In the exemplary embodiment illustrated in the drawings, the laser beam 120 is transmitted downwardly through the transparent upper clamping plate 113 and two sheets of thermoplastic material 110 and 111, which correspond to the workpieces 110, 111 to be welded. The two sheets 110 and 111 are optically transparent but nevertheless absorb part of the laser beam 120 when it is a 2-micron (2 μm) fiber laser. Two-micron lasers are characterized by greatly increased absorption by unfilled polymers, which enables highly controlled melting through the thickness of the workpiece parts 110, 111, which can be optically clear without the need of any laser sensitive additives. The heat produced by the partial absorption of the laser beam 120 in both sheets 110 and 111 melts the material in the sheets sufficiently to cause them to fuse together along the path of the laser beam 120 as the upper clamping plate 113 continuously presses the two sheets 110, 111 against each other, thereby producing the desired welding of the two sheets 110, 111 of thermoplastic material in the weld zone traversed by the laser beam 120. The resulting weld seam is a clear weld where the two clear workpieces are fused together.

Figure 4:
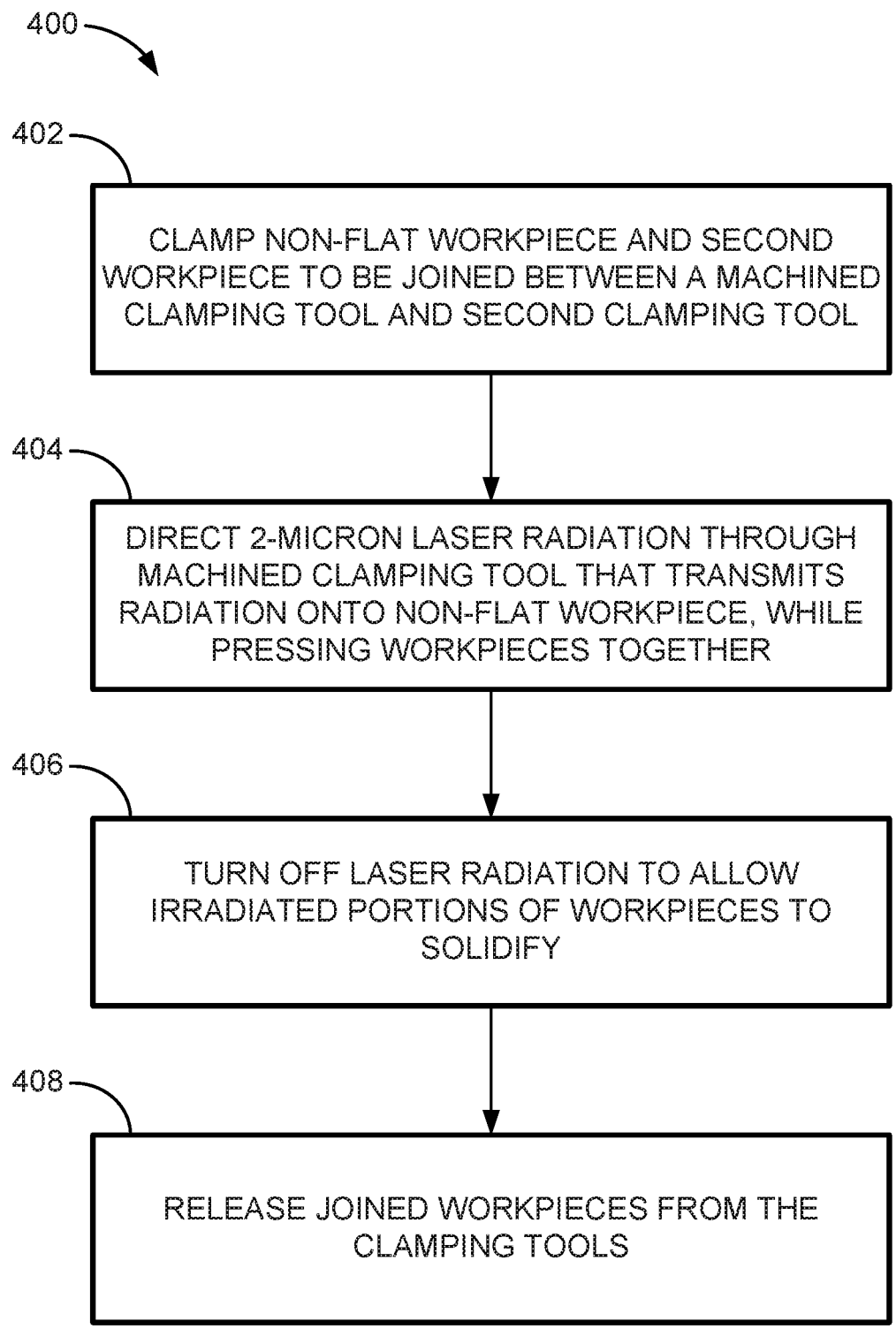
FIG. 4 is a flow chart diagram of a method of laser welding workpieces according to an aspect of the present disclosure.

FIG. 4 illustrates a flowchart of an example laser welding method 400 for joining portions of a first workpiece and a second workpiece where the workpieces are made of thermoplastic material that absorbs laser radiation having a wavelength of about 2 microns. The method 400 includes clamping a non-flat workpiece and a second workpiece (that can be flat or non-flat), which are to be joined together, between a machined clamping tool and a second clamping tool (which may or may not be machined) (402). A 2-micron laser radiation is directed through the machined clamping tool, which transmits the radiation onto the non-flat workpiece, while pressing both workpieces together, such as using a pair of clamping tools (404). The laser radiation is turned off to allow the irradiated portions of the workpieces to solidify to join them together (406). Finally, the joined workpieces are released from the clamping tools (408).

Aspects of the present disclosure are applicable but not limited to packaging of consumer goods, medical products, and other products that required sealed packages.

Referring to FIG. 5, many similar components and labels are used as with respect to FIG. 2. In addition, FIG. 5 demonstrates an edge 6-6. Edge 6-6 is shown further in FIG. 6, where a first pair of workpieces 507 (workpiece 501 and 502) and a second pair of workpieces 509 (workpiece 503 and 504) are separated by a film 505. According to one embodiment, film 505 is a non-absorbing carrier film, and workpieces 501, 502, 503, and 504 are film layers of thermoplastic film.

FIGS. 5 and 6 demonstrate how a first bag is welded on top of a second bag. Workpiece 501 and 502 have their edges sealed by a laser beam 120 to form a first bag 507 at the same time as laser beam 120 seals the edges of the second pair of workpieces 509 into a second bag. A portion of the laser beam 120 (e.g. 1940 nm laser radiation) is absorbed by the first pair of workpieces 507, which causes workpieces 501 and 502 to melt and become welded together when a welding pressure is applied. However, a large portion of radiation from laser beam 120 is transmitted through these two workpieces 501 and 502. This remaining large portion of radiation from laser beam 120 is sufficient to melt another the second pair of workpieces 509 placed underneath the first pair 507, forming another bag.

Film 505 provides a barrier to prevent the first pair 507 from sticking to the second pair 509 so that a first bag 507 are easily separated from a second bag 509. The present disclosure contemplates that film 505 is any material that does not readily absorb the laser radiation and does not stick to either first pair 507 or second pair 509. For example, film 505 is an off-the-shelf FEP film. Most thermoplastics absorb IR radiation in 1940 nm wavelength (for example, the radiation from laser beam 120). Such thermoplastics allow polymers to be welded without the addition of laser sensitive agents. However, FEP and other fluoropolymers do not absorb radiation at a 1940 nm wavelength. Therefore, FEP and such other fluoropolymers are used as fabricated tooling in a plastic welding process that uses a 1940 nm laser. For example, the fabricated tooling is film 505, which will then separate the two pairs of workpieces 507 and 509 while transferring laser radiation from laser beam 120 through film 505 to the second pair 509 with minimal energy loss.

FIGS. 5 and 6 show that the throughput of a laser welding process double (or even) triple by stacking pairs of workpieces (e.g. pairs 507 and 509) on top of each other. Although two pairs of workpieces 507 and 509 are shown stacked on each other and separated by a film 505, the present disclosure contemplates that more than two pairs of workpieces are stackable on top of each other to further increase the throughput, so long as each pair of workpieces is separated by a film and the laser beam 120 is strong enough to sufficiently melt each pair of workpieces.

Figure 7:
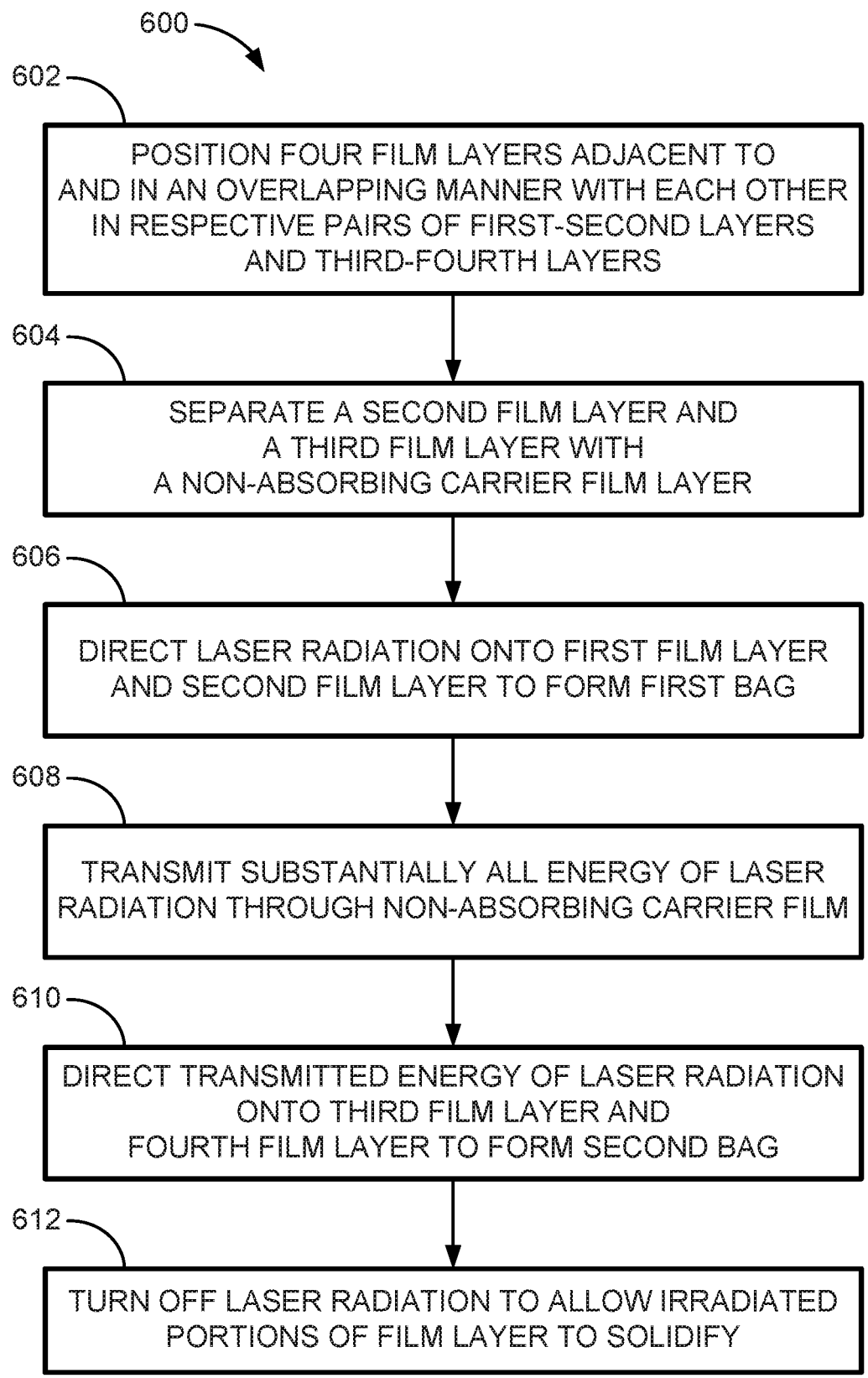
FIG. 7 is a flow chart diagram of a method of laser welding a plurality of bags simultaneously, according to another aspect of the present disclosure.

An exemplary methodology 600 is discussed with respect to FIG. 7. Methodology 600 is performed on the systems of FIGS. 5 and 6, for example.

Methodology 600 begins at step 602 by positioning four film layers adjacent to each other. The four film layers are positioned in an overlapping manner so that each film overlaps with the remaining three films. The four films are positioned in respective pairs of (1) a first and second layer and (2) a third and fourth layer. In some examples of step 602, six film layers lay adjacent to each other positioned in respective pairs of (1) a first and second layer, (2) a third and fourth layer, and (3) a fifth and sixth layer.

Methodology 600 proceeds to step 604 to separate a second film layer and a third film layer with a non-absorbing carrier film layer. In some examples of step 604 where there are three pairs of film layers, a fourth film layer and a fifth film layer are also separated with a non-absorbing carrier film layer.

Methodology 600 proceeds to step 606 to provide for directing laser radiation onto the first film layer and the second film layer to form a first bag.

Methodology 600 proceeds to step 608. Step 608 provides for transmitting substantially all energy of said laser radiation through the non-absorbing carrier film.

Methodology 600 proceeds to step 610. Step 610 provides for directing the transmitted energy of the laser radiation onto the third film layer and the fourth film layer. Step 610 therefore yield a second bag.

Methodology 600 ends at step 612. Step 612 provides for turning off the laser radiation to allow irradiated portions of the film layers to solidify.

Table 2 below shows the effectiveness of a laser welding process as described with respect to FIGS. 5-7 by measuring the power loss measurements for the materials involved.

TABLE 2

|  | No media | Laser beam transmitted through 0.14 mm thick FEP Film | Laser beam transmitted through 2 layers of 0.28 mm PVC Film | Laser beam transmitted through 2 layers of PVC film and 1 layer of FEP film | Laser beam transmitted through 0.5 mm transparent Silicon sheet |
|---|---|---|---|---|---|
| Power meter reading (Watts) | 26.9 | 25.9 | 24.6 | 24.5 | 26.1 |

The measurements of table 2 are provided from a welding process which simultaneously welded two square-shaped inflatable enclosures set on top of each other. Each enclosure can be made of 0.28 mm-thick PVC film. A 0.14 mm-thick FEP film was placed between the two pairs of PVC film layers, effectively separating the two enclosures. Both enclosures were equally strong and had no defects in them.

Table 2 demonstrates that there is only ~1 W loss of laser power when transmitting through the FEP film, and only ~2.5 W when transmitting through the entire upper bag structure (wherein the upper bag structure comprises two layers of PVC film and the separating FEP film together). Considering that the power output used for welding process of this material is typically in the range of 95-110 W, a loss of ~2.5 W is insignificant. Therefore, Table 2 shows that an exemplary welding process as in FIGS. 5-6, according to an embodiment of the present disclosure, allows enough energy to be delivered to the bottom pair of PVC sheets to melt them and form a bond.

Table 2 provides power measurements at a lower power than the typical range of ultrasound welding because power measurements require at least 6 seconds of exposure. This heating of the same spot for such long time would degrade the thermoplastic film and skew the readings if the power for a typical ultrasound welding process was used (the power losses in a material are defined by the material properties). Consequently, all measurements in Table 2 were performed at a lower power, which exposed the film to the laser for a sufficient time to get a power meter reading.

The thickness of most of commonly-used films is normally under 0.1 mm. Many commonly-used films (such as PC, COC, PMMA) have a better transparency than PVC. Therefore, the material selected for process demonstration in Table 2 (the material was a 0.28 mm-thick PVC film) presents a more challenging case for simultaneous welding that commonly-used films would present. Thus, for the majority of commonly-used films (such as those used in building containers for medications as well as many other applications), the proposed process can be applied with even greater ease. The present disclosure contemplates that for the majority of commonly-used films, the approach as discussed with respect to FIGS. 5-7 would make possible to simultaneously weld at least 3 bags stacked vertically, and separated by a non-absorbing and non-sticking film between them.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A laser welding method for simultaneously joining respective film layers of a plurality of bags, the method comprising:
   positioning a plurality of film layers adjacent to and in an overlapping manner with each other, the plurality of film layers including a first film layer adjacent to a second film layer and a third film layer adjacent to a fourth film layer, each layer of the plurality of film layers being made of a thermoplastic material that absorbs laser radiation having a wavelength of about 2 microns;
   separating the second film layer and the third film layer with a non-absorbing carrier film layer, the non-absorbing carrier film layer being made of a material that transmits substantially all energy of the laser radiation;

directing the laser radiation onto the first film layer and the second film layer to melt irradiated portions of the first film layer and the second film layer to one another forming a first bag;

transmitting substantially all the energy of the laser radiation not absorbed by the first film layer and the second film layer through the non-absorbing carrier film interposed between the second film layer and the third film layer;

directing the transmitted energy of the laser radiation onto the third film layer and the fourth film layer to melt irradiated portions of the third film layer and the fourth film layer to one another forming a second bag, the second bag being formed generally simultaneously with the first bag; and turning off the laser radiation and allowing at least the irradiated portions of the first film layer, the second film layer, the third film layer, and the fourth film layer to solidify.

2. The laser welding method of claim 1, wherein the material of the non-absorbing carrier film includes a fluoropolymer.

3. The laser welding method of claim 2, wherein the fluoropolymer is fluorinated ethylene propylene.

4. The laser welding method of claim 1, further comprising heating the plurality of film layers with the laser radiation.

5. The laser welding method of claim 4, further comprising controlling power and rate of movement of the laser radiation along edges of the plurality of film layers to melt respective edges in areas to be joined.

6. The laser welding method of claim 1, wherein the non-absorbing carrier film has a thickness of approximately 0.14 millimeters, the plurality of film layers each having a thickness in the range of approximately 0.1 to approximately 0.28 millimeters.

7. The laser welding method of claim 6, wherein the non-absorbing carrier film includes at least one of a fluorinated ethylene propylene (FEP) material or a silicone material, each of the plurality of film layers including a polyvinyl chloride (PVC) material.

8. The laser welding method of claim 1, further comprising positioning the non-absorbing carrier film in an overlapping manner with the second film layer and the third film layer.

9. The laser welding method of claim 1, wherein the non-absorbing carrier film remains solid while the transmitted energy of the laser radiation is directed onto the third film layer and the fourth film layer.

10. The laser welding method of claim 1, wherein the non-absorbing carrier film includes a thermoplastic material that lacks a laser-absorbing additive.

11. The laser welding method of claim 1, further comprising using a power output in the range of about 95-100 Watts for the laser radiation, losing about 2.5 Watts before directing the transmitted energy of the laser radiation onto the third film layer and the fourth film layer.

* * * * *